(12) United States Patent
Brajon et al.

(10) Patent No.: US 12,163,807 B2
(45) Date of Patent: Dec. 10, 2024

(54) RELIABLE POSITION SENSOR

(71) Applicant: Melexis Technologies SA, Bevaix (CH)

(72) Inventors: Bruno Brajon, Bevaix (CH); Gael Close, Bevaix (CH); Lorenzo Lugani, Bevaix (CH); Lionel Tombez, Bevaix (CH)

(73) Assignee: MELEXIS TECHNOLOGIES SA, Bevaix (CH)

( * ) Notice: Subject to any disclaimer, the term of this patent is extended or adjusted under 35 U.S.C. 154(b) by 0 days.

(21) Appl. No.: 17/730,575

(22) Filed: Apr. 27, 2022

(65) Prior Publication Data
US 2022/0349730 A1 Nov. 3, 2022

(30) Foreign Application Priority Data
Apr. 29, 2021 (EP) ..................................... 21171388

(51) Int. Cl.
*G01D 5/14* (2006.01)
*G01D 5/20* (2006.01)
*G01D 5/244* (2006.01)

(52) U.S. Cl.
CPC ............... *G01D 5/145* (2013.01); *G01D 5/20* (2013.01); *G01D 5/244* (2013.01)

(58) Field of Classification Search
CPC .. G01D 3/00; G01D 3/08; G01D 5/00; G01D 5/12; G01D 5/14–145; G01D 5/16;
(Continued)

(56) References Cited

U.S. PATENT DOCUMENTS

| 9,116,017 B2 * | 8/2015 | Lee ........................ G01B 7/003 |
| 2006/0089784 A1 * | 4/2006 | Spicer .................. F02D 41/009 |
| | | 123/476 |

(Continued)

FOREIGN PATENT DOCUMENTS

| DE | 19520299 A1 | 12/1996 |
| DE | 102018204901 A1 | 10/2019 |

(Continued)

OTHER PUBLICATIONS

Search Report from Corresponding European Application No. EP21171388.8, Search Completed Sep. 15, 2021.

*Primary Examiner* — Huy Q Phan
*Assistant Examiner* — David B Frederiksen
(74) *Attorney, Agent, or Firm* — Workman Nydegger

(57) ABSTRACT

A hybrid position sensor for determining a position of a hybrid target includes a conductive target and a magnet configuration which are rigidly connected and at least partially overlapping. The position sensor has a first transducer configured for generating a first signal induced by the conductive target and indicative for the position of the hybrid target; a second transducer, at least partially overlapping with the first transducer, and configured for generating a second signal induced by the magnet configuration and indicative for the position of the hybrid target; a processing device configured for receiving the first signal to determine a first position of the hybrid target and for receiving the second signal to determine a second position of the hybrid target and for determining reliability of the position sensor based on the determined first and second position.

13 Claims, 11 Drawing Sheets

(58) Field of Classification Search
CPC ........ G01D 5/20; G01D 5/204; G01D 5/2053; G01D 5/244; G01D 5/54; G01D 5/56
See application file for complete search history.

(56) References Cited

U.S. PATENT DOCUMENTS

| | | | |
|---|---|---|---|
| 2010/0163333 A1* | 7/2010 | Patil | B62D 15/0245 180/402 |
| 2014/0021943 A1* | 1/2014 | Watanabe | G01R 33/093 324/207.21 |
| 2015/0160042 A1 | 6/2015 | Bogos et al. | |
| 2015/0260546 A1* | 9/2015 | Hirota | G01D 5/14 324/207.21 |
| 2015/0323348 A1* | 11/2015 | Liu | G01P 3/487 324/207.17 |
| 2016/0123771 A1* | 5/2016 | David | G01D 5/147 324/207.2 |
| 2017/0138760 A1* | 5/2017 | Olsen | B62D 5/008 |
| 2018/0216967 A1* | 8/2018 | Sun | G01D 5/2046 |
| 2018/0292233 A1* | 10/2018 | Vandersteegen | G01B 7/30 |
| 2019/0242956 A1* | 8/2019 | Przytarski | G01D 5/16 |
| 2019/0331507 A1* | 10/2019 | Bogos | G01D 5/04 |
| 2020/0271480 A1* | 8/2020 | Shaga | G01D 5/2073 |
| 2020/0309566 A1* | 10/2020 | Fujita | G01L 5/221 |
| 2021/0018309 A1 | 1/2021 | Ausserlechner | |
| 2021/0048490 A1* | 2/2021 | Bartos | G01R 33/0076 |

FOREIGN PATENT DOCUMENTS

| | | |
|---|---|---|
| DE | 102019207070 A1 | 11/2020 |
| WO | 2020119905 A1 | 6/2020 |

\* cited by examiner

RELIABLE POSITION SENSOR

FIELD OF THE INVENTION

The invention relates to the field of position sensors. More specifically it relates to position sensors for safety critical applications.

BACKGROUND OF THE INVENTION

In safety critical applications, such as for example automotive applications it is important that the obtained sensor data is reliable and that, if there is a sensor malfunction, it can be identified. Position sensors may for example be applied in devices for steering angle and BLDC motor control.

Such safety critical applications lead to an increasing need for redundant position sensor systems. This may be achieved by the combination of heterogenous technologies is known, however state-of-the-art solutions are not compact.

An example of such a state-of-the-art solution is given in DE19520299A1. This patent application relates to a device for position detection. DE19520299A1 aims to provide a position detection device which is reliable and provides precise measurements. It therefore provides two sensors. An example of such a device is shown in FIG. 8. It comprises an optical position sensor and a magnetic sensor. The optical sensor comprises a code disk located on the lower housing part and encompasses the disk in the shape of a fork. The magnetic sensor also comprises a magnet arrangement, which consists of two individual magnets, firmly connected to the shaft.

In such state-of-the-art position sensors, the presence of heterogeneous technologies leads to an increase of the size of the position sensor. In view of the safety critical applications there is, therefore, a need for compact and reliable position sensors.

SUMMARY OF THE INVENTION

It is an object of embodiments of the present invention to provide compact and reliable position sensors.

The above objective is accomplished by a method and device according to the present invention.

In a first aspect embodiments of the present invention relate to a hybrid position sensor for determining a position of a hybrid target. The hybrid target comprises a conductive target and a magnet configuration which are rigidly connected and at least partially overlapping. The position sensor comprises:
- a first transducer configured for generating a first signal induced by the conductive target and indicative for the position of the hybrid target,
- a second transducer, at least partially overlapping with the first transducer, and configured for generating a second signal induced by the magnet configuration and indicative for the position of the hybrid target,
- a processing device configured for receiving the first signal to determine a first position of the hybrid target and for receiving the second signal to determine a second position of the hybrid target and for determining reliability of the position sensor based on the determined first and second position.

In embodiments of the present invention the first transducer comprises one or more coils and the second transducer is a magnetic sensor mounted such that the one or more coils at least partially overlap the second transducer. The one or more coils may for example be present on a printed circuit board.

In embodiments of the present invention the hybrid position sensor is configured for determining an angular position of the hybrid target.

In embodiments of the present invention the hybrid position sensor is configured for determining a linear position of the hybrid target.

In embodiments of the present invention the second transducer comprises a Hall sensor or a magnetoresistive sensor.

In embodiments of the present invention the first transducer comprises at least one transmit coil to generate a magnetic field and at least one receive coil to receive a magnetic field and is configured for generating the magnetic field using the transmit coil and for receiving a signal from the receive coil.

In embodiments of the present invention the first transducer and the second transducer are packaged in the same package.

In a second aspect embodiments of the present invention relate to a position device comprising a hybrid target which comprises a conductive target and a magnet configuration (214) which are rigidly connected and at least partially overlapping, the position device, moreover, comprising a hybrid position sensor (100) according to any of the previous claims.

In embodiments of the present invention the conductive target and the first transducer are configured such that the first position can be obtained with a first resolution and the magnet configuration, and the second transducer are configured such that the second position can be obtained with a second accuracy, wherein the first resolution is different from the second accuracy. With respect to the second transducer reference is made to accuracy rather than resolution. Typically, the second transducer has a higher angular error (i.e., deviation with respect to the real value), so a lower accuracy.

In embodiments of the present invention the conductive target and the first transducer are configured such that the first position can be obtained within a first range and wherein the magnet configuration and the second transducer are configured such that the second position can be obtained within a second range, wherein the first range is at least partially overlapping with the second range.

In embodiments of the present invention the first range and the second range may be the same.

In embodiments of the present invention the magnet configuration comprises a magnet having at least 4 poles.

In embodiments of the present invention the second transducer is a differential sensor which comprises a plurality of Hall sensors or magnetoresistive sensors.

In embodiments of the present invention the conductive target and the magnet configuration are stacked.

In embodiments of the present invention the conductive target is made of a conductive ferromagnetic material and the magnet is obtained by magnetizing the ferromagnetic material.

In a position device according to embodiments of the present invention the first and the second transducer may be aligned with respect to the rotation axis or with respect to the linear path of the hybrid target. Alternatively, the first or the second transducer may be positioned off-center (e.g., the magnetic sensor may be positioned off-center).

Particular and preferred aspects of the invention are set out in the accompanying independent and dependent claims.

Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
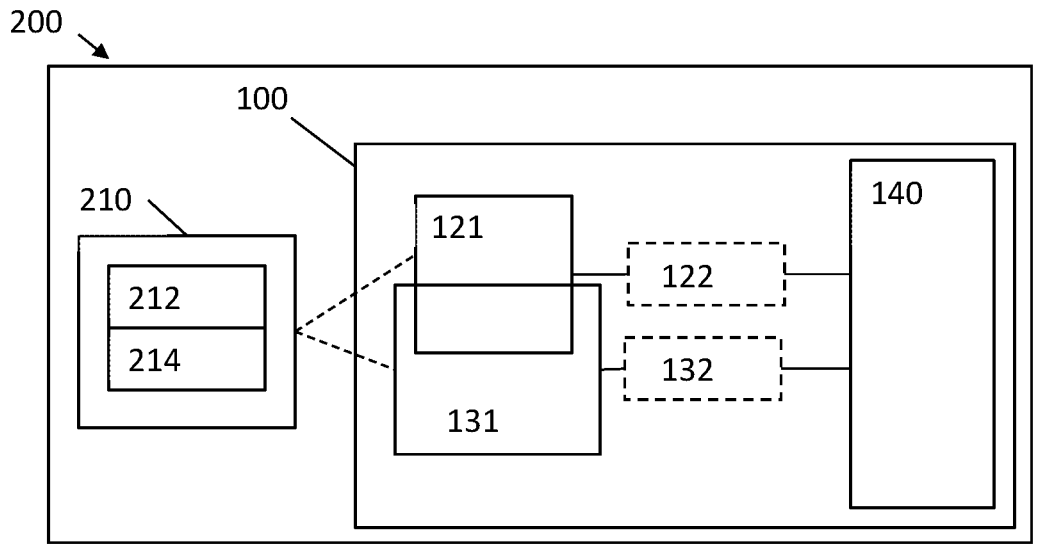
FIG. 1 shows a schematic drawing of a redundant position sensor and of a position device in accordance with embodiments of the present invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In a first aspect embodiments of the present invention relate to a hybrid position sensor 100 for determining the position of a hybrid target 210 and in a second aspect embodiments of the present invention relate to a position device 200 comprising such a position sensor 100 and comprising the hybrid target 210. A schematic drawing of a hybrid position sensor 100 in accordance with embodiments of the present invention and of a position device 200 in accordance with embodiments of the present invention is shown in FIG. 1.

A hybrid target, according to embodiments of the present invention, comprises a conductive target 212 and a magnet 214 which are rigidly connected and at least partially overlapping and can move in a movement space.

The hybrid position sensor 100 comprises a first transducer 121 configured for generating a first signal induced by the conductive target 212 and indicative for the position of the hybrid target 210.

The hybrid position sensor, moreover, comprises a second transducer 131, at least partially overlapping with the first transducer, and configured for generating a second signal induced by the magnet configuration 214 and indicative for the position of the hybrid target 210. In the schematical drawing of FIG. 1 the at least partial overlapping is schematically illustrated by the overlapping boxes 121 and 131.

The second transducer may comprise for example comprise a Hall sensor or a magnetoresistive sensor.

The hybrid sensor, moreover, comprises a processing device 140 configured for receiving the first signal to determine a first position of the hybrid target and for receiving the second signal to determine a second position of the hybrid target and for determining reliability of the position sensor based on the determined first and second position.

In embodiments of the present invention the processing device 140 is configured for determining that the hybrid position sensor is not reliable if the difference between the first and the second position is larger than a predefined threshold or for determining that the hybrid position sensor is reliable if the difference between the first and the second position is smaller than a predefined threshold. Thus, the integrity of the hybrid position sensor is checked by the processing device 140. The processing device 140 may be integrated together with the second transducer and other processing circuitry in a same integrated circuit or it may be implemented as a separate controller.

It is an advantage of embodiments of the present invention that redundant sensors are provided (the first and the second transducer) without significantly increasing the size of the hybrid position sensor. This is achieved by providing a first transducer which is sensitive for a moving conductive target and by providing a second transducer which is sensitive for a magnet, and by, at least partially overlapping the first and the second transducer. By at least partially, or even completely overlapping both transducers, the size of the hybrid position sensor can be reduced. In embodiments of the present invention the first and the second transducer may be stacked. It was surprisingly found by the inventors that the inductive transducer (the first transducer) and the magnetic transducer (the second transducer) can be stacked overlapping with each other without significantly perturbating each other.

FIG. 1 also schematically illustrates the position device 200 according to the second aspect of the present invention. The position device 200 comprises a hybrid target 210 and a hybrid position sensor 100 in accordance with embodiments of the present invention. The hybrid target 210 comprises a conductive target 212 and a magnet 214 which are rigidly connected and at least partially overlapping.

Figure 2:
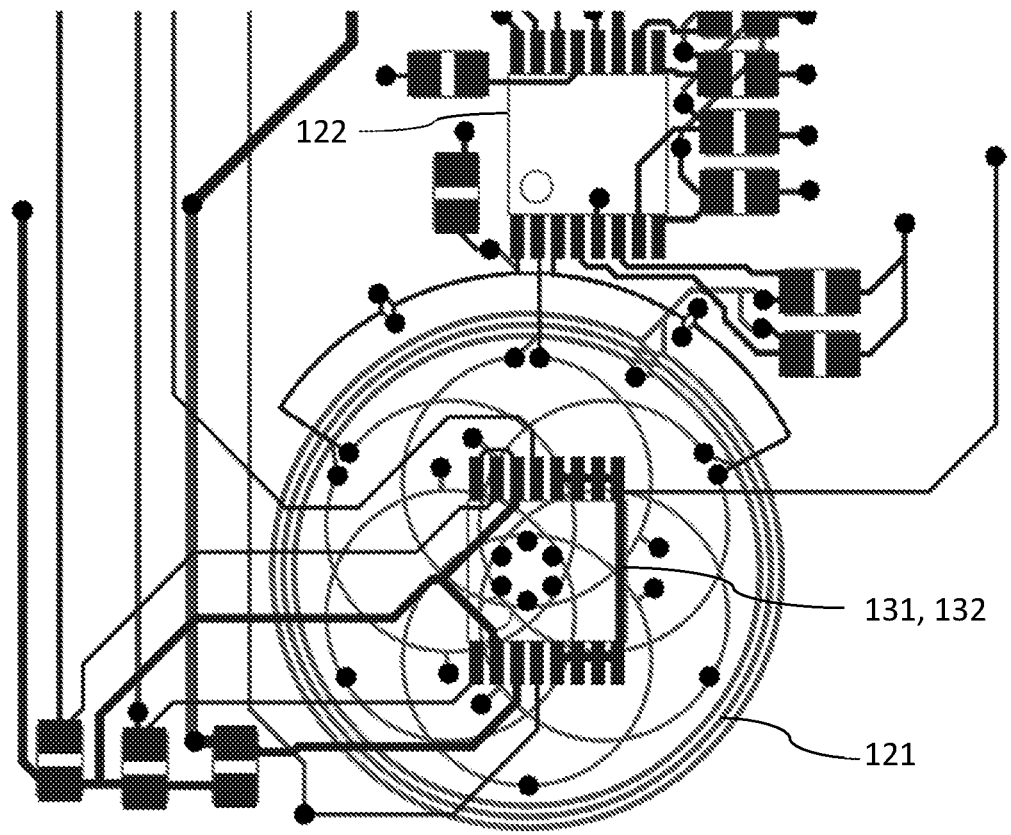
FIG. 2 shows a printed circuit board layout of a redundant position sensor wherein the first transducer and the second transducer are overlapping.

FIG. 2 shows a printed circuit board layout of a redundant position sensor in accordance with embodiments of the present invention. As can be seen in this figure the first transducer 121 comprises a set of coils. These coils are connected with a processing circuit 122. The layout also shows a chip comprising second transducer 131 which is a magnetic sensor and processing circuitry 132. The coils of the first transducer 121 and the second transducer 131 are overlapping. The processing circuit 122 for processing the signals of the first transducer 121 may be embedded in the same chip as the second transducer 131.

The conductive target 212 and the first transducer 121 may be configured such that the first position can be obtained with a first resolution. The magnet configuration 214 and the second transducer 131 may be configured such that the second position can be obtained with a second resolution.

In some embodiments of the present invention the first resolution may be different from the second resolution, whereas in other embodiments of the present invention the first resolution and the second resolution may be the same.

If the technologies have different resolutions, still the redundancy can be maintained (at least redundancy at the lowest resolution). If both technologies are correctly working the obtained position can even have the highest resolution.

The conductive target 212 and the first transducer 121 are configured such that the first position can be obtained within a first range and the magnet configuration 214 and the second transducer 131 are configured such that the second position can be obtained within a second range, wherein the first range is at least partially overlapping with the second range.

It is thereby an advantage that redundancy can be obtained in the overlapping part of the first range and the second range. The reliability of the position device can be determined in this overlapping part.

In some embodiments of the present invention the first range and the second range may be the same. In that case redundancy is present over the complete sensing range, and hence the reliability can be determined over the complete sensing range. The sensing range may for example be a range between 1° and 360°. The range may for example be 360°, 180°, 120°, 90°, 72°, 60°, or 45° or any other value which is suitable for the application for which the sensor is intended.

Figure 3:
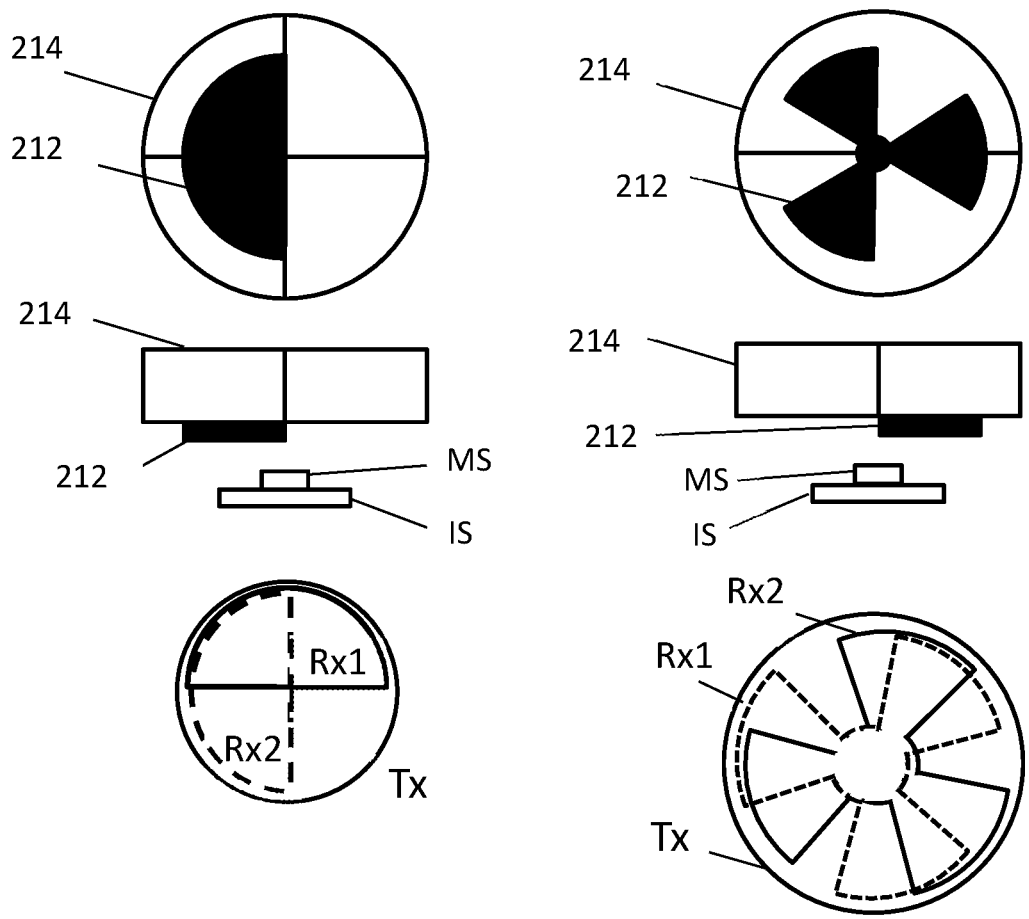
FIG. 3 shows schematic drawings of a target and of a redundant position sensor comprising a Hall position device, and an inductive position device, wherein the Hall position device and the inductive position device are overlapping and wherein the magnet configuration and the conductive target are stacked and overlapping and have different inductive and magnetic ranges between the left and the right column, in accordance with embodiments of the present invention.

Examples of position devices for which the first range is overlapping with the second range and for which the first range is different from the second range are illustrated in the columns of FIG. 3. In such position devices the integrity of the position can be redundantly verified within the smallest sensing range.

The top two drawings respectively show a schematic drawing of a top view, and of a lateral cross-section of a hybrid target.

In these examples the first transducer comprises an inductive sensor IS which is overlapping with the magnetic sensor MS (e.g., a Hall sensor) of the second transducer. The bottom drawings are schematic drawings of a top view of a coil configuration of an inductive sensor IS for inductively measuring the position of the conductive target.

In the example of the left column the magnet 214 is a 4-pole magnet and the conductive target 212 is a half-moon target. In the example of the left column an inductive range of 360° can be obtained and a magnetic range of 180° can be obtained. Hence, the position can be unambiguously checked over 180°.

The first transducer comprises at least one transmit coil to generate a magnetic field and at least one receive coil to receive a magnetic field and is configured for generating the magnetic field using the transmit coil and for receiving a signal from the receive coil. In the exemplary embodiment in FIG. 2, the first transducer comprises one transmit coil (Tx) and 2 receive coils (Rx1, Rx2). Different other configurations may be implemented as long as there is at least one transmit coil and at least one receive coil (e.g., 2 or 3 or 4 receive coils). In this example the receive coils are two coils in quadrature (90° phase shift electrical between the signals). Also, for example 3 coils can be used (with a 120 deg phase shift). Generating and measuring the currents through the Tx- and Rx-coils respectively may be done by the inductive sensor IS.

The second transducer comprises at least one Hall sensor for obtaining a signal indicative for a position of the hybrid target within the second range. A plurality of Hall sensors may be present such that a differential measurement can be done. This differential measurement allows to reduce the contribution of stray fields which are disturbing the position measurement. In one embodiment, the second transducer may comprise 4 or 8 Hall sensors configured to measure two magnetic field gradients generated by a 4-pole magnet. An integrated magnetic concentrator may be present for concentrating the magnetic flux lines and bending them towards the one or more Hall plates to increase the sensitivity (in this drawing the integrated magnetic concentrator is not drawn to scale, on scale it may for example be 10 times smaller).

In embodiments of the present invention a coil may have an inverted and a non-inverted coil segment (the inverted coil segment is not shown in FIG. 3). By adding the complementary inverted coil segment (in which the current flows in the opposite direction), a common mode signal which is present on the inverted and non-inverted coil segment can be cancelled. Thus, the transducer can be configured to generate a signal from which the common mode component is removed (such that only the target induced signal is visible in the generated signal).

It is an advantage of embodiments of the present invention that the inductive technology is immune to stray fields. The reason therefore is that the RX coils only detect the AC field transmitted by the TX-coil. Therefore, the reliability obtained by comparing the first signal and the second signal is also taking into account stray fields. Additionally, range extension may be provided by combining the first and second signal.

Another example is illustrated in the right column of FIG. 3. In this example the magnet 214 is a 2-pole magnet and the conductive target 212 is a three-lobe target. Using such a configuration an inductive range of 120° and a magnetic range of 360° is obtained. The position can, therefore, be unambiguously checked over 120°.

In this configuration the first transducer comprises at least one transmit coil (in the exemplary embodiment it is one transmit coil Tx) to generate a magnetic field and at least one receive coil (in this exemplary embodiment two receive coils Rx1 and Rx2) to receive a magnetic field and comprises an inductive sensor IS which is configured for generating the magnetic field using the transmit coil and for receiving a signal from the receive coil.

The second transducer comprises at least one magnetic sensor MS (e.g., a Hall sensor) for obtaining a signal indicative for the sector in which the hybrid target is positioned. Also, in this example a plurality of Hall sensors may be present such that a differential measurement can be done. This differential measurement allows to reduce the contribution of stray fields which are disturbing the position measurement. For the differential measurement the support transducer may comprise four Hall elements.

An integrated magnetic concentrator (IMC) may be present for concentrating the magnetic flux lines and bending them towards the one or more Hall plates to increase the sensitivity (in this drawing no integrated magnetic concentrator is present). The IMC may for example bend magnetic field lines such as to measure a magnetic field using a horizontal Hall element wherein the magnetic field is parallel with the substrate. The horizontal Hall element on itself is not sensitive to magnetic field parallel with the substrate. By bending the magnetic field lines it becomes possible to measure the magnetic field parallel with the substrate. In case the sensor is configured for measuring differential fields in the Z direction (out-of-plane) no IMC is needed.

In this example the first transducer has a position accuracy of less than 1° or even less than 0.1°. This accuracy can be provided over a range of 120° corresponding with one sector. The accuracy of the $2^{nd}$ transducer can for example be the same as the accuracy of the first transducer, or could even be up to 10 times worse than the first, e.g., 5 times worse. It could be less than 1°, or 5°, for example. It could even be more as long as these are static errors, e.g., +/−15°, or +/−30°, or even more.

Figure 9:
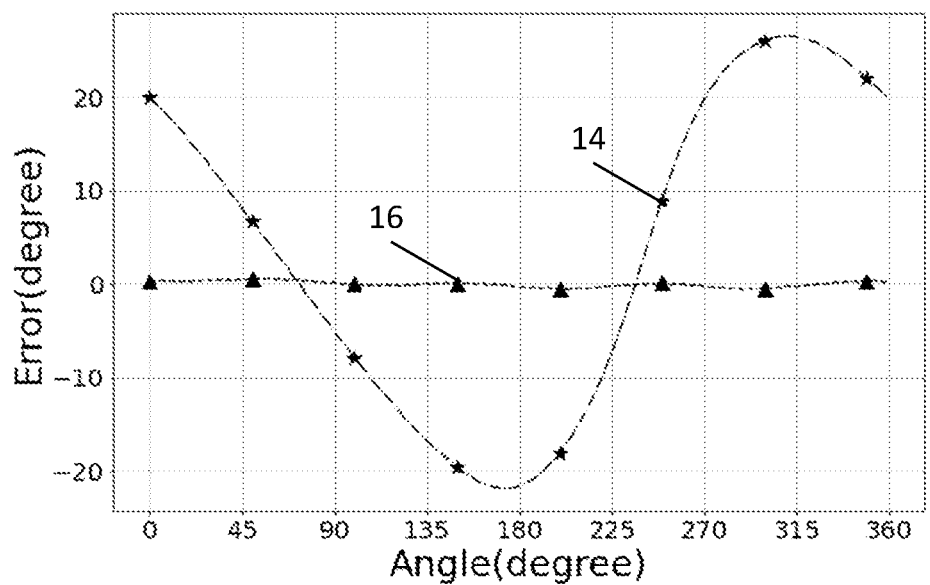
FIG. 9 shows an error curve for an inductive sensor which may be used by a hybrid position sensor, in accordance with embodiments of the present invention, for determining the reliability of the position sensor.

If the errors are static errors (i.e., at a given position the error of the $2^{nd}$ transducer is always substantially the same), a comparison table may be calibrated. Either the difference between the two values are compared to a fixed threshold without calibration (e.g., 1 or 5 or) 10°, or the difference may be compared to a position-dependent threshold, which is determined by calibration (an example of such an error curve is illustrated in FIG. 9). This is especially beneficial when the inductive sensor is highly miniaturized and significant non linearity errors appear.

In embodiments of the present invention the hybrid target 210 comprises a conductive target 212 and a magnet 214. In some embodiments of the present invention these may be separate components which are connected together. In some embodiments the conductive target 212 and the magnet 214 may be integrated in one component.

In embodiments of the present invention the conductive target 212 and the magnet 214 are separate components which are stacked such that they are at least partially overlapping. They may be planar components. They may be circular planar components. In the latter case they may have the same central axis, or they may be positioned off axis. As can be seen from the examples in FIG. 3 to FIG. 6 the radius of the conductive target may be smaller than or equal to the radius of the magnet. In embodiments of the present invention the radius of the magnet may be substantially equal (e.g., less than 10%, or even less than 5% difference) to the radius of the conductive target. The conductive target 212 may be non-magnetic and the magnet 214 may be electrically isolating.

When the conductive target 212 and the magnet 214 are separate components, the magnet may be made of insulating material (e.g., an insulating Ferrite) to avoid interference between the conductive target and the magnet. The conductive target can be a thin (<100 μm) patterned metallic film (e.g., Aluminum). The conductive target may be stacked on the magnet.

Examples thereof are illustrated in FIG. 3 to FIG. 6 where the magnet 214 and the conductive target 212 are stacked on top of each other and have the same rotation axis. Thus, the overall diameter of the hybrid target can be kept limited. As the diameter of the target can be kept limited also the diameter of the coils which are generating and receiving the magnetic field can be kept limited, and hence also the size of the hybrid position sensor can be kept limited. The size of the coils may for example be scaled down to less than 5 mm.

Figure 4:
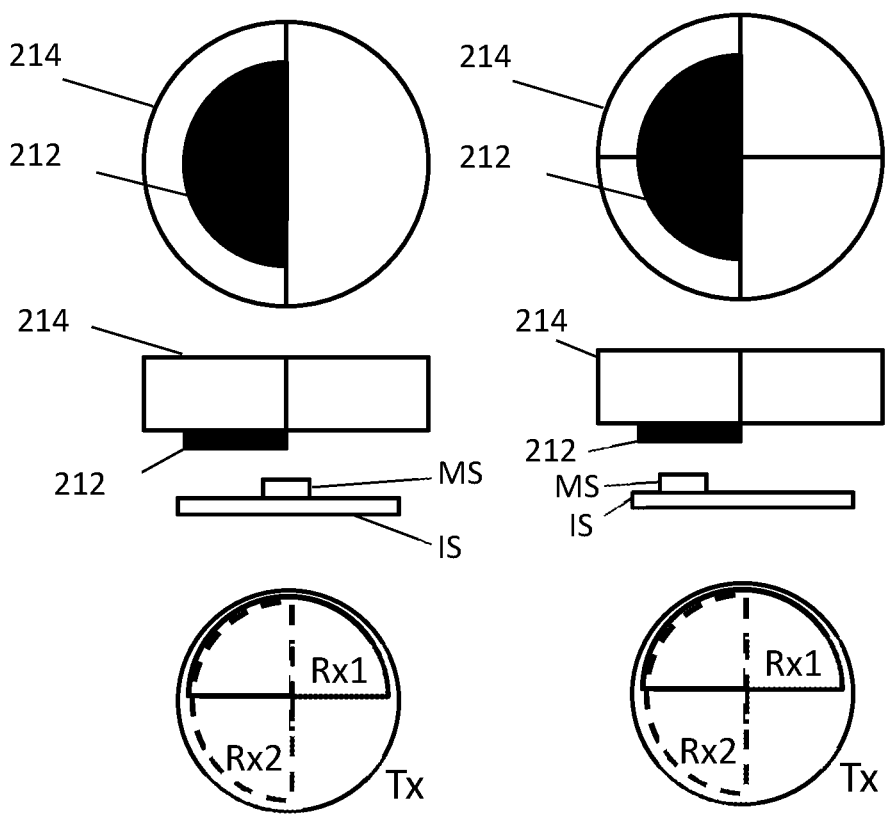
FIG. 4 shows schematic drawings as in FIG. 3, with in the left column a sensor with an inductive range and a magnetic range of 360° and in the right column a sensor for which the magnetic sensor is put off-axis.

The left target configuration illustrated in FIG. 4 shows a magnet 214 which is a 2-pole magnet such that the magnetic range is 360°, and both ranges are equal. Therefore, in such a configuration the position can be unambiguously checked over 360°. The inductive target and the magnetic poles may be aligned (as shown) but it is not necessary. They may be phase shifted by 90°, or any angle.

The right configuration illustrated in FIG. 4 is similar to the configuration in the left column of FIG. 3, with that difference that the magnetic sensor (of the second transducer) is put off axis. The transmit and receive coils of the first transducer are still centered.

Figure 5:
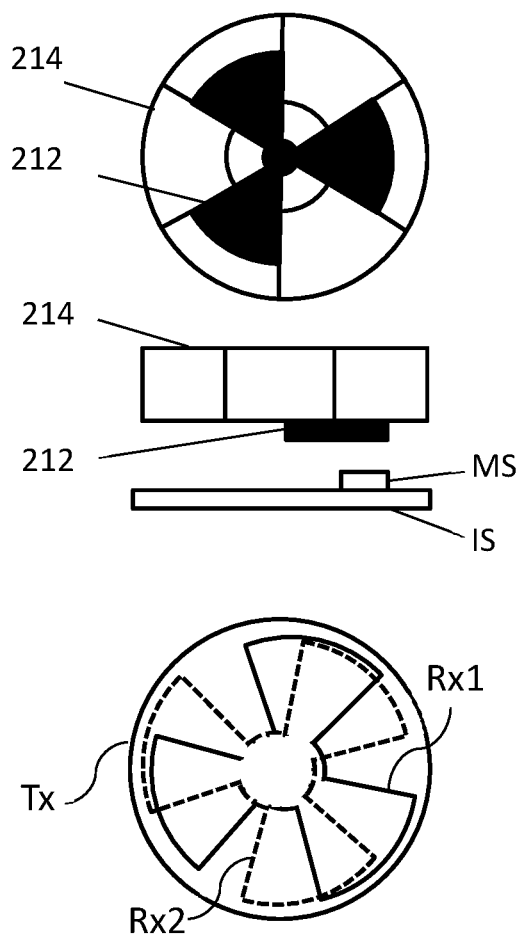
FIG. 5 shows schematic drawings as in FIG. 3, wherein the magnet configuration is a 6-pole ring magnet and wherein the magnetic sensor is put off-axis.

The hybrid target in FIG. 5 has a magnet configuration comprising a 6-pole ring magnet. In this configuration the magnetic sensor (of the second transducer) is put off-axis. The position can be unambiguously checked over 120°. The conductive target may have a range which is the same as the range of the magnet configuration, but it may for example also have a bigger range.

In embodiments of the present invention the magnet configuration may be 4-pole magnet. Such a magnet configuration may for example be used in conjunction with an inductive target having 2 lobes. Another configuration may for example be an 8-pole magnet in conjunction with an inductive target having 4 lobes.

Figure 6:
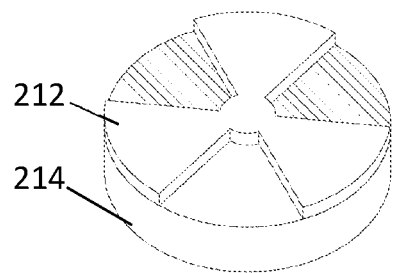
FIG. 6 shows schematic drawings of targets with an overlapping conductive target and magnet configuration of a position device in accordance with embodiments of the present invention.
Figure 6:
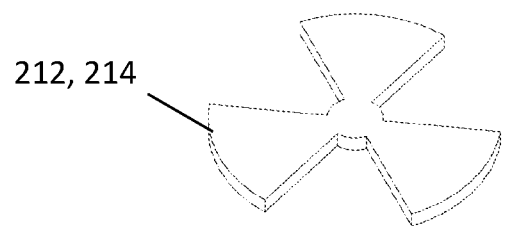
Figure 6:
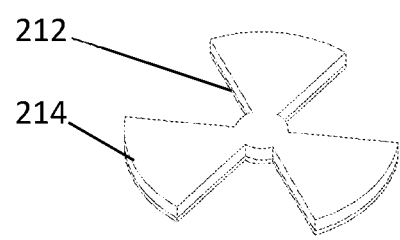

The stacked configuration of FIG. 6 comprises a three-lobe conductive target 212, offering a range of 120°. Using such a target an accuracy of more than 1° or even more than 0.1° can be achieved. The conductive target is stacked on a two-pole magnet 214. With the combination of the two-pole magnet and the three-lobe conductive target, the reliability of the position sensor can be determined with a 120° range segment.

In embodiments of the present invention the conductive target 212 and the magnet 214 may be formed of one component. This may be achieved by machining the conductive target of ferromagnetic material and by magnetizing the ferromagnetic material in plane. The ferromagnetic material may for example be Neodymium. In a particular embodiment the ferromagnetic material may for example be machined into three sectors and magnetized in plane. An example thereof is illustrated by the middle drawing of FIG. 6. In the example the single element serves simultaneously as a metallic conductive target for the inductive technology, and as a 2-pole magnet for the magnet-based technology.

The 2-pole magnet is obtained by magnetizing the machined ferromagnetic material along one of the lobes. By doing so the target behaves as a 2-pole magnet. Thus, a more simplified and possibly cheaper target is obtained thanks to the combination of two functions (conductive target and magnet) into one component.

The bottom drawing of FIG. 6 represents yet another embodiment. In this example the magnet 214 has the same shape as the conductive target 212. This conductive target 212 is a coating of conductive material on the magnet 214. Thus, a similar embodiment as in the middle drawing is obtained, but with the advantage that the magnet 214 can be made of non-conductive magnetic material (such as NdFeB or ferrite). The coating can for example be made of nickel (Ni). Any suitable coating material known by the skilled person can be used. It can be present on one side of the target (as shown in the figure), on both sides of the target, or all around the target.

In embodiments of the present invention a first readout chain 122 may be present for the first transducer 121 and a second readout chain 132 may be present for the second transducer 131. The readout chains may be configured for converting an analog signal which is representative for the position into a digital signal which is representative for the position. In some embodiments of the present invention the readout chains may have shared signal conditioning elements. For example, the ADC may be shared between both readout chains. In some embodiments of the present invention the hybrid position sensor 100 comprises a readout chain which is shared between the first transducer and the second transducer. It is an advantage of embodiments of the present invention that the cost increase in terms of silicon area for introducing the second transducer can be kept to a minimum. This is especially the case for embodiments where at least part of the readout chain can be reused between the first transducer and the second transducer. The cost increase can for example be kept below 10%.

Figure 7:
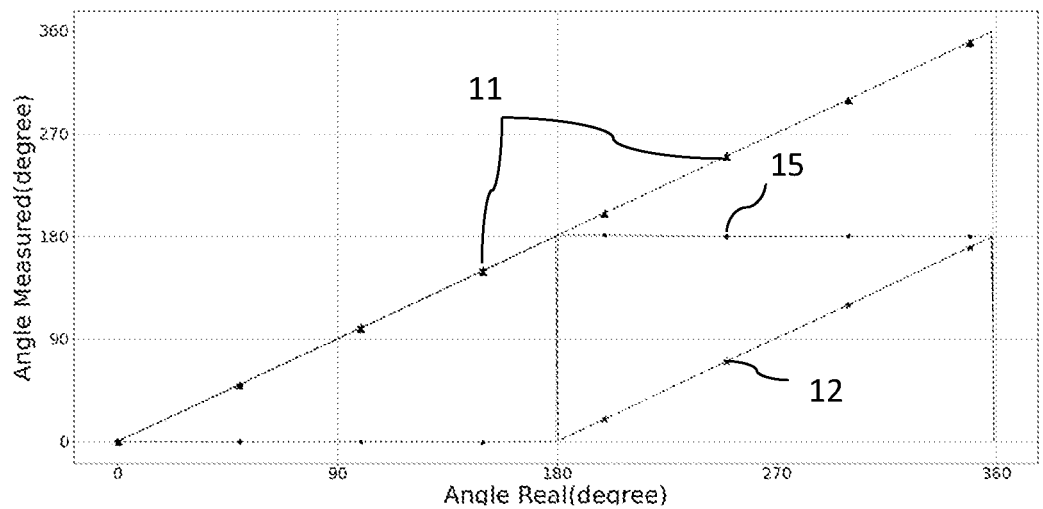
FIG. 7 shows the angles obtained using the first transducer, and using the second transducer in accordance with embodiments of the present invention.

FIG. 7 shows the angle 11 (i.e., the first position) obtained using the first inductive transducer, and the angle 12 (i.e., the second position) obtained using the second magnetic transducer in function of the real position of a rotor. In this example both sensors have a relatively low error which is not visible in the graphs. The difference 15 between the first position 11 and the second position 12 is also shown.

The reliability of the position sensor may be determined based on the determined first and second positions. Note that in this example the first position sensor has a first range larger than a second range of the second position sensor.

The processing device may for example be configured for executing the following steps:
    a) Get the first position (e.g., angle value) from the first transducer;
    b) Get the second position (e.g., angle value) from the second transducer;
    c) Compute the difference between the values obtained at steps a) and b);
    d) Compare the computed difference to a threshold value (in this example 0°);
    e) Compare the computed difference to a threshold value+a fixed angle (in this example the angle is 180°);
    f) If both differences computed at steps d) and e) are beyond the threshold value, report a fault;
    g) Repeat.

In another exemplary method according to embodiments of the present invention the processing device may be configured for executing the following steps:

a) Get the first position (e.g., first angle value) from the first transducer;
b) Get second position (e.g., second angle value) from the second transducer;
c) Retrieve a plurality of expected values from a look-up table based on the first position (in this example 2 expected values are retrieved as the second angle value is periodic and is repeated twice within the full period of the first angle value);
d) Compare the expected values with the second position;
e) If none of the expected values match with the second position (within an error margin), report a fault;
f) Repeat.

Optionally, an absolute position 13 (see FIG. 8) can be obtained by combining the first signal and the second signal, in accordance with embodiments of the present invention.

Figure 8:
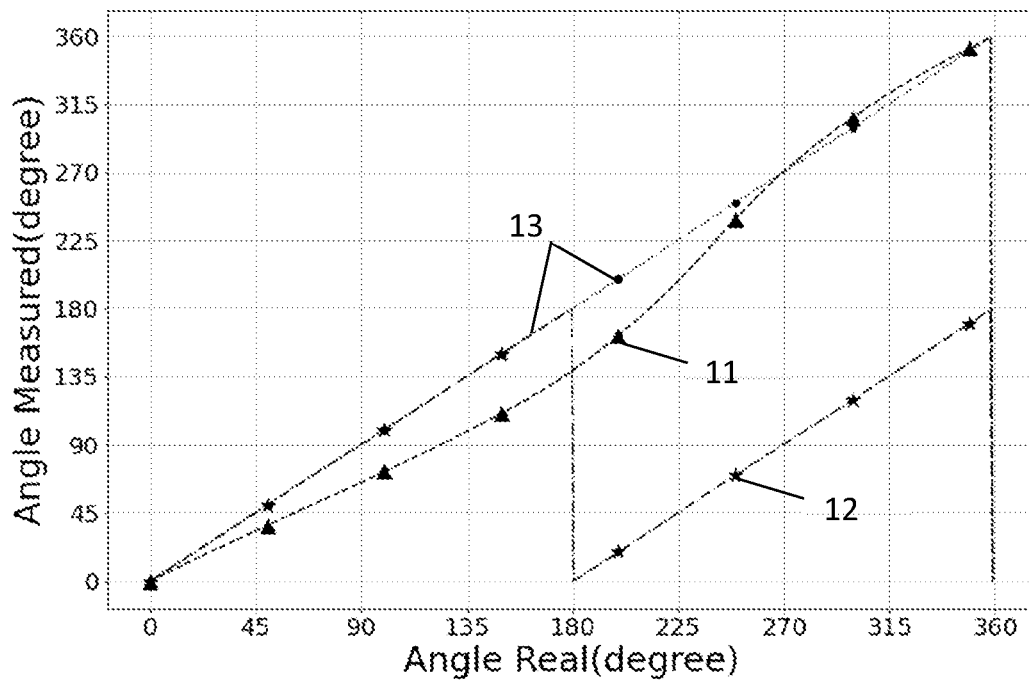
FIG. 8 shows the angles obtained using the first transducer, using the second transducer, and the eventual position (also expressed as an angle) obtained by combining the first signal and the second signal, in accordance with embodiments of the present invention.

In the example illustrated in FIG. 8 the coils of the first transducer are miniaturized and the effect of the different stray metals (such as the PCB trace and contacts, the leadframe, and the integrated circuit itself) of the magnetic sensor becomes more important. Because of those stray metals, the inductive sensor 11 has a relatively important error. However, the error is still less than the size of the sector. This figure also shows the second position 12 obtained using the second transducer and an absolute position 13, obtained by combining the first position 11 and the second position 12.

Also, in this example the processing device is configured for determining the reliability of the position sensor based on the determined first and second position. Similarly, as explained above, the reliability comparison can be for example be done using a predetermined look-up table.

FIG. 9 shows an error curve 14 of an inductive sensor in function of the real position of the rotor. Such a curve may be used by a hybrid position sensor, in accordance with embodiments of the present invention, for determining the reliability of the position sensor. In this example the error curve 14 for the inductive sensor ranges between +25/−22°. The range of such an error curve increases when the coils of the first transducer are reduced in size. This error curve may for example be the error curve of a first transducer with miniaturized coils wherein the effect of the stray metals of the magnetic sensor becomes more important. In embodiments of the present invention this curve is measured and used as a basis for the reliability comparison (either to correct the inductive sensor, or as a reference for the comparison). FIG. 9 also shows an error curve 16 of the magnetic sensor.

From FIG. 8 it can be derived that, even though the ranges are different, the angle can be unambiguously verified over a range of 180°, i.e., from 0 to 180°, or 180 to 360°. The angle may even be verified over the full 360° range. In this case there are two possible values in the full range for a value of the sector range. For example, the second position will indicate '0°' for a real position of the target of 0° or 180°. Hence, the fault coverage is lower but is still acceptable in some applications.

Besides determining the reliability, of the sensor, the obtained positions may be combined to increase the range of the sensor to the range of the transducer with the highest range and to increase the resolution to the resolution of the transducer with the highest resolution. FIG. 8 shows the angles obtained using the first transducer, using the second transducer, and the eventual position (also expressed as an angle) obtained by combining the second signal (indicative for a position within a sector) and the first signal (indicative for the sector). The second signal may for example be expressed as an angle. It may be computed from the transducers quadrature signal, for example by calculating a ratio between two transducer signals (e.g., cos/sin), and computing an arctan of the ratio (e.g., $\alpha=a\tan(\cos/\sin)$). Note that in this example all angles are by convention wrapped into the [−180°, +180°] range. The output of the second readout chain 12 is accurate, but provides only a reduced range of 180°. The output of the first readout chain 11 is less accurate but covers the full turn. A combined angle $\theta_0$ can be readily constructed by selecting either $\theta_2$ or $\theta_2+180°$. In embodiments of the present invention the most plausible option is selected based on the value of $\theta_1$. The most plausible option may for example be the one yielding the smallest angle error between $\theta_0$ and $\theta_1$. This gives a combined output angle with the accuracy of $\theta_2$ and the range of $\theta_1$ (full 360°).

In embodiments of the present invention the error on the signal which is indicative for the sector in which the target is positioned may be so small that the sector can be unambiguously identified. The maximum error level is, hence, limited by the sector size. It is the size of the sector within which the transducer with the highest resolution can do an accurate measurement. One may have an error of a few degrees, or 5°, or up to 10°, or even more. As explained above, the error can also be calibrated (linearized). For a direct comparison without calibration and without look up table, the maximum error is for example preferably less than 5°, or 10°, for example.

In some embodiments of the present invention the accuracy in the readout chain with the highest resolution may be limited to remain below 10. This amounts to about 1 to 2 orders of magnitude of specification relaxation compared to usual targets. It is a particular advantage of embodiments of the present invention that the accuracy of the readout chain with lowest resolution allows to determine the reliability of the obtained position within a sector and allows to identify the sector in which the hybrid target is positioned (see for example FIG. 7 and FIG. 8 and the corresponding description).

In embodiments of the present invention an algorithm may be implemented on the processing device for receiving the first signal to determine a first position of the hybrid target and for receiving the second signal to determine a second position of the hybrid target and for determining reliability of the position sensor based on the determined first and second position.

In embodiments of the present invention the conductive target 212 may be a half moon target. In embodiments of the present invention the hybrid position sensor may be packaged in a chip.

In some embodiments of the present invention the size of the coils may be kept limited (e.g., less than 1 cm).

In embodiments the coils may be integrated in the same chip package. Examples thereof are shown in the schematic drawings of FIG. 10 and FIG. 11. The IC in these figures comprises the second transducer for generating a second signal induced by the magnet configuration. The coils of the first transducer are partially covered by the IC, in accordance with embodiments of the present invention.

In other embodiments the coils may have a larger size. In that case the coils may be implemented on a PCB. In such a case the first transducer comprises one or more coils on a printed circuit board and the second transducer is a chip mounted on the printed circuit board on such a position that wires of the coils pass under the second transducer.

In such configurations the first transducer and the second transducer are overlapping. It is found by the inventors that currents through the one or more coils of the first transducer, induced by the conductive target which moves over the coils, are not disturbing the operation of the second transducer, nor is the magnet configuration of the hybrid target or the second transducer disturbing the operation of the first transducer.

Hybrid position sensors according to embodiments of the present invention may be configured for determining an angular or a linear position of a hybrid target.

Figure 10:
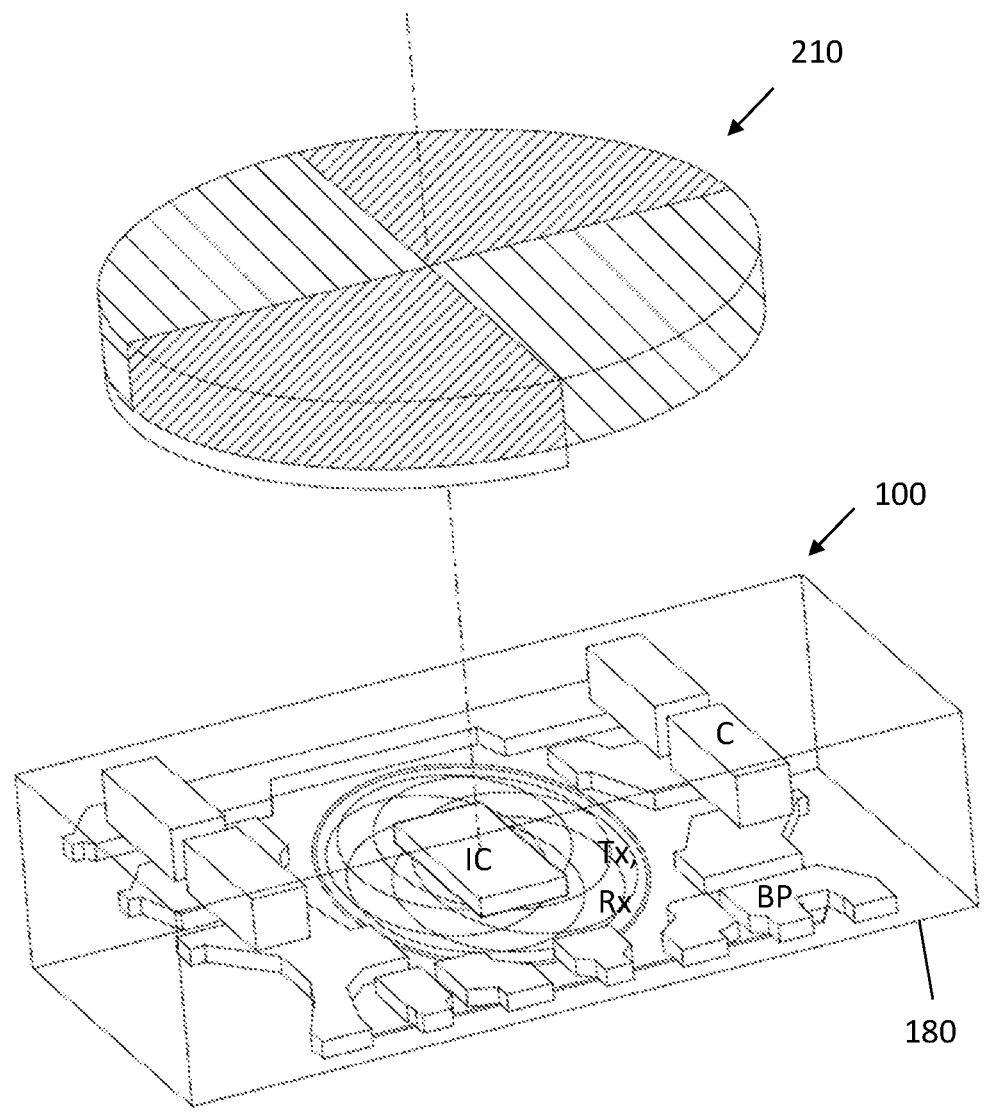
FIG. 10 shows a schematic drawing of a hybrid target and an angular hybrid position sensor in accordance with embodiments of the present invention wherein the first transducer and the second transducer are packaged in the same chip.

In the 3D-schematic drawing of FIG. 10 a hybrid target 210 and a position sensor 100 are shown. In this example the position sensor is an angular sensor. The dashed line is the rotation axis. The hybrid target 210 comprises a quadrupole magnet and the conductive target is a half-moon target. The invention is not limited to a quadrupole magnet. The magnet may for example be a 2-pole magnet such that both sensors have 360° of sensing range. Alternatively, the inductive target may comprise 2 lobes such that the inductive sensing range is 180°.

When the first transducer and the second transducer have different ranges the hybrid position device can either be used within the range of the smallest sensing range such as to compare two positions unambiguously, or it can be used within the full range. In the latter case, there are two possible values in the full range for a same value in the smallest sensing range.

In this example the first transducer and the second transducer are packaged in the same package 180. In the figure the coils are indicated by tx, rx. Functionality of the first transducer, the second transducer and the processing device may be implemented in the IC. Capacitors C and bondpads BP may be present in the same package.

Figure 11:
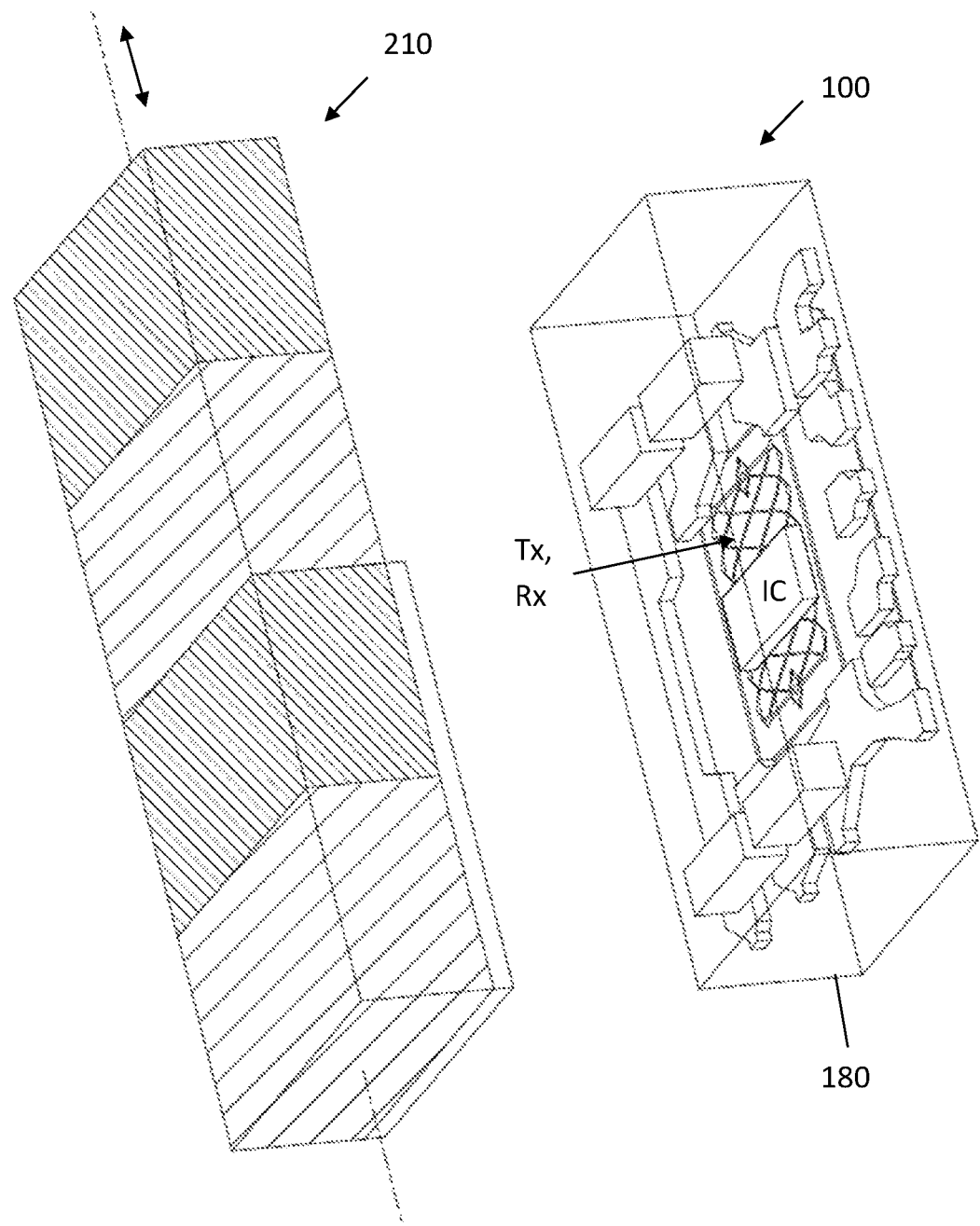
FIG. 11 shows a schematic drawing of a hybrid target and a linear hybrid position sensor in accordance with embodiments of the present invention wherein the first transducer and the second transducer are packaged in the same chip.

FIG. 11 shows a hybrid target 210 and a position sensor 100 for determining a linear position of the hybrid target. The dashed line shows the direction along which the hybrid target can be moved. Also, in this example the first transducer and the second transducer are packaged in the same package 180 and they are overlapping. The coil configuration is different from the coil configuration in FIG. 10 in view of the fact that a linear position is detected using this hybrid position sensor. In the example in FIG. 11 the magnet configuration is a 4-pole magnet configuration. In other embodiments a 2-pole magnet configuration may for example be used. Thus, the same range may be obtained for the first transducer as for the second transducer.

Figure 12:
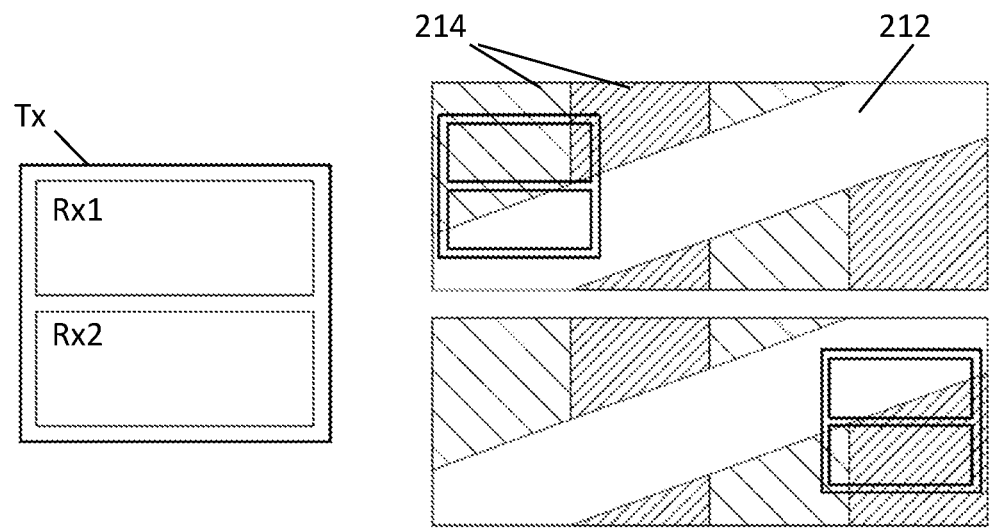
FIG. 12 and FIG. 13 show schematic drawings of a hybrid target and of a coil configuration for a linear position sensor in accordance with embodiments of the present invention.

The left drawing in FIG. 12 shows a schematic drawing of 2 RX-coils (Rx1, Rx2) circumvented by one TX-coil (Tx). The right drawing shows a hybrid target comprising two magnet pairs 214 (the diagonal shading in one direction indicating a North-pole and the diagonal shading in another direction indicating a South-pole). Alternatively, a 2-pole magnet pair may be used to have the same range for the first transducer as for the second transducer. A conductive target is diagonally crossing the hybrid target. In the top right drawing the coils are positioned in the left segment. In that case the voltage induced in the second coil Rx2 will be larger than the voltage induced in the first coil Rx1. In the bottom right drawing the coils are positioned in the right segment. In that case the voltage induced in the second coil Rx2 will be smaller than the voltage induced in the first coil Rx1. A ratio between the current through the two coils can be calculated and used as signal indicative for the position of the hybrid target. The second transducer may be used for obtaining a second position of the target. Both obtained positions may be compared to determine the reliability of the hybrid position sensor.

Figure 13:
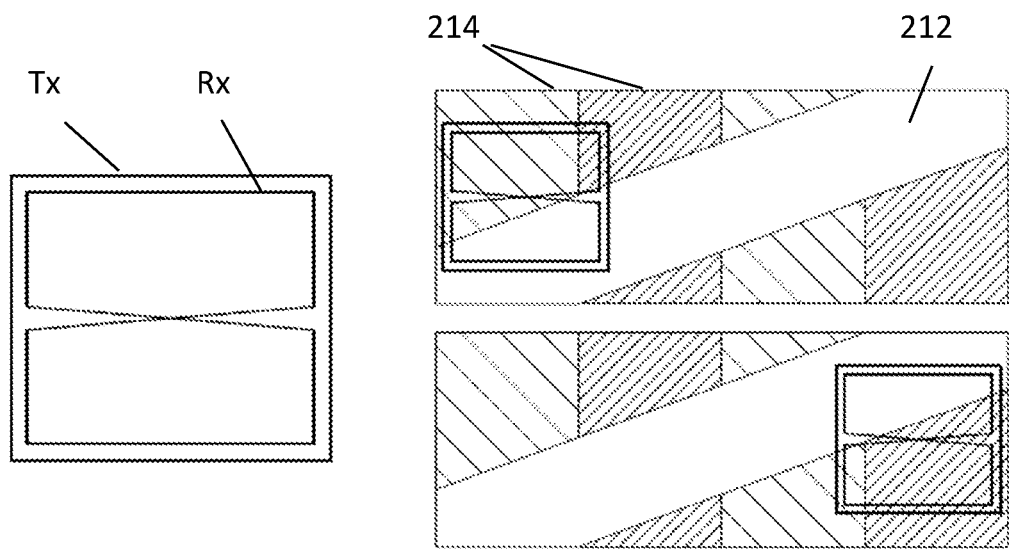

An alternative configuration of a Tx and Rx coil is shown in FIG. 13. In this example a circular Tx coil is circumventing an eight shaped Rx coil. A positive signal will be induced in the Rx coil when the coils are positioned in the left segment and a negative signal will be induced in the Rx coil when the coils are positioned in the right segment. In the example a 4-pole magnet is shown. The magnet may also be a 2-pole magnet. In that case both transducers will have the same range.

In embodiments of the present invention the first transducer is configured for obtaining a first signal indicative for a position of the hybrid target within a first range and with a first resolution. The second transducer is configured for obtaining a second signal indicative for the position of the hybrid target within a second range and with a second resolution. The first range may be different from the second range and the first resolution is different from the second resolution. The reliability can be obtained within the smallest range by comparing the first and second position.

Figure 14:
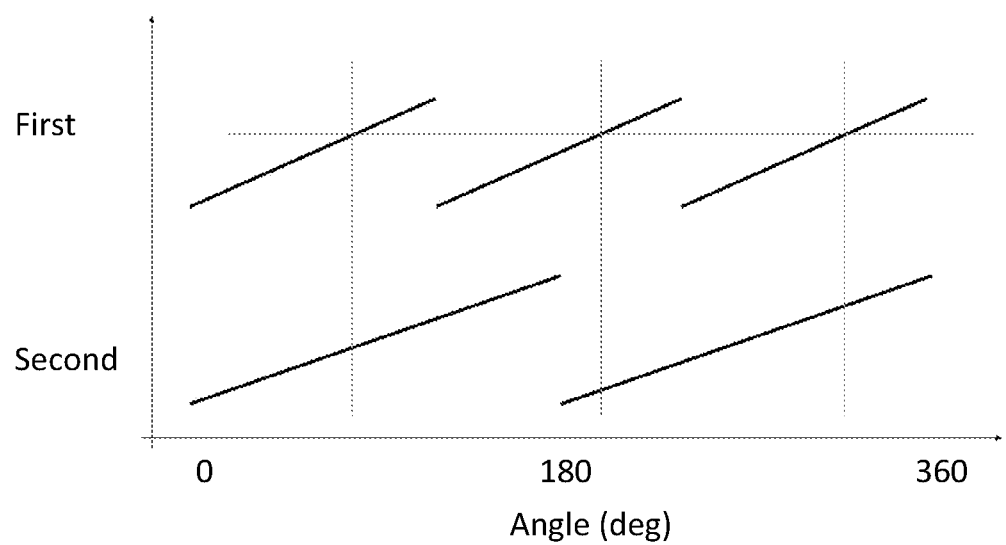
FIG. 14. shows a graph with the first signal of the first transducer and the second signal of the second transducer in function of the angular position of the hybrid target obtained using a hybrid position sensor in accordance with an exemplary embodiment of the present invention.

By combining the first signal and the second signal the position of the hybrid target can be determined with the resolution of the first signal. It is thereby noted that the range obtained by the combination of the first and second signal may even be wider than the range of the signal with the widest range. This is further explained using FIG. 14. It shows the first signal (the signal of the first transducer) and the second signal (the signal of the second transducer) in function of the position of the hybrid target (in this case expressed as an angular position).

By comparing the first signal with the second signal within the range of the first signal, the reliability of the hybrid position sensor can be determined. A similar method as explained with relation to FIG. 7 and FIG. 8 may be used. In this example there are 3 possible expected values of the second transducer.

When the processing device is configured for executing the first method, first the first position obtained from the first transducer is compared with the second position obtained from the second transducer, and with the second position +120°, and with the second position +240°. If none of the 3 comparisons is matching the processing device indicates there is a reliability problem.

When the processing device is configured for executing the second method, 3 expected values are obtained from a look-up table (which is obtained through calibration) based on the first position obtained from the first transducer. These are compared with the second position from the second transducer for determining the reliability.

Note that in this and the previous examples the first position from the first transducer is used for obtaining one or more expected values of the second position from the second transducer and that the position sensor is considered reliable if the one of the expected values matches with the second position, and not reliable if this is not the case. In some embodiments of the present invention this may also be inversed if for one position obtained from the second transducer, different positions can be expected from the first transducer. In that case, the second position from the second transducer may be used for obtaining one or more expected values of the first position from the first transducer and the position sensor may be considered reliable if one of the expected values matches with the first position, and not reliable if this is not the case.

By combining the first signal and the second signal, the position can be obtained with the resolution of the position of indicated by the first signal and with a range which is a combination of the first and second range and is larger than the first and second range. Even though the second transducer has a range of 120°, it is still possible to resolve the full 360° range. As same angle values from the main transducer have different values in the support transducer, no ambiguity is present in the combination of both signals, and the 360° range can still be resolved.

In summary, in embodiments of the present invention two readout transducers are present (a first and second transducer) which are implemented in different technologies. Thus, an efficient combination is obtained of Hall and inductive position sensing which provides redundancy and, therefore, permits to determine reliability of the position sensor based on the determined first and second position.

The invention claimed is:

1. A hybrid position sensor for determining an angular position of a hybrid target which comprises a conductive target and a magnet configuration which are rigidly connected and at least partially overlapping, the hybrid position sensor comprising:
   a first transducer configured for generating a first signal induced by the conductive target and indicative for the angular position of the hybrid target,
   a second transducer, at least partially overlapping with the first transducer, and configured for generating a second signal induced by the magnet configuration and indicative for the angular position of the hybrid target,
   a processing device configured for receiving the first signal to determine a first angular position of the hybrid target and for receiving the second signal to determine a second angular position of the hybrid target and for determining reliability of the hybrid position sensor based on the determined first and second angular position,
   wherein the first transducer and the second transducer are stacked.

2. The hybrid position sensor according to claim 1, wherein the first transducer comprises one or more coils and wherein the second transducer is a magnetic sensor mounted such that the one or more coils at least partially overlap the second transducer.

3. The hybrid position sensor according to claim 1, wherein the second transducer comprises a Hall sensor or a magnetoresistive sensor.

4. The hybrid sensor according to claim 1, wherein the first transducer comprises at least one transmit coil to generate a magnetic field and at least one receive coil to receive the magnetic field and is configured for generating the magnetic field using the transmit coil and for receiving a signal from the receive coil.

5. The hybrid sensor according to claim 1, wherein the first transducer and the second transducer are packaged in a same package.

6. A position device comprising the hybrid target which comprises the conductive target and the magnet configuration which are rigidly connected and at least partially overlapping, the position device, moreover, comprising the hybrid position sensor according to claim 1.

7. The position device according to claim 6, wherein the conductive target and the first transducer are configured such that the first angular position can be obtained with a first accuracy and wherein the magnet configuration and the second transducer are configured such that the second angular position can be obtained with a second accuracy, wherein the first accuracy is different from the second accuracy.

8. The position device according to claim 6, wherein the conductive target and the first transducer are configured such that the first angular position can be obtained within a first range and wherein the magnet configuration and the second transducer are configured such that the second angular position can be obtained within a second range, wherein the first range is at least partially overlapping with the second range.

9. The position device according to claim 8, wherein the first range and the second range are the same.

10. The position device according to claim 6, wherein the magnet configuration comprises a magnet having at least 4 poles.

11. The position device according to claim 6, wherein the second transducer is a differential sensor which comprises a plurality of Hall sensors or magnetoresistive sensors.

12. The position device according to claim 6, wherein the conductive target and the magnet configuration are stacked.

13. The position device according to claim 6, wherein the conductive target is made of a conductive ferromagnetic material and wherein the magnet is obtained by magnetizing the ferromagnetic material.

* * * * *